(12) United States Patent
Yue et al.

(10) Patent No.: US 12,030,168 B2
(45) Date of Patent: Jul. 9, 2024

(54) CLUTCH ASSEMBLY FOR A POWER TOOL

(71) Applicant: MILWAUKEE ELECTRIC TOOL CORPORATION, Brookfield, WI (US)

(72) Inventors: Brian J. Yue, Weston, MA (US); Hugh A. Dales, Germantown, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/890,696

(22) Filed: Aug. 18, 2022

(65) Prior Publication Data

US 2023/0055198 A1 Feb. 23, 2023

Related U.S. Application Data

(60) Provisional application No. 63/234,358, filed on Aug. 18, 2021.

(51) Int. Cl.
*B25F 5/00* (2006.01)
*F16D 43/206* (2006.01)

(52) U.S. Cl.
CPC ............ *B25F 5/001* (2013.01); *F16D 43/206* (2013.01)

(58) Field of Classification Search
CPC ...................................................... B25F 5/001
See application file for complete search history.

(56) References Cited

U.S. PATENT DOCUMENTS

| | | |
|---|---|---|
| 5,458,206 A | 10/1995 | Bourner et al. |
| 5,704,433 A | 1/1998 | Bourner et al. |
| RE37,905 E | 11/2002 | Bourner et al. |
| 8,136,607 B2 | 3/2012 | Frauhammer et al. |
| 8,316,959 B2 | 11/2012 | Roehm |
| 8,528,658 B2 | 9/2013 | Roehm et al. |
| 9,168,651 B2 * | 10/2015 | Hecht .................. F16D 43/206 |
| 9,494,200 B2 | 11/2016 | Kelleher et al. |
| 9,764,391 B2 | 9/2017 | Roehm et al. |
| 10,245,717 B2 | 4/2019 | Schenk et al. |
| 10,737,373 B2 | 8/2020 | Duncan et al. |

(Continued)

FOREIGN PATENT DOCUMENTS

| | | |
|---|---|---|
| CN | 202571380 U | 12/2012 |
| CN | 110614393 A | 12/2019 |

(Continued)

OTHER PUBLICATIONS

International Search Report and Written Opinion for Application No. PCT/US2022/040746 dated Dec. 16, 2022 (10 pages).

*Primary Examiner* — Eyamindae C Jallow
(74) *Attorney, Agent, or Firm* — Michael Best & Friedrich LLP

(57) ABSTRACT

A power tool includes a housing, a drive mechanism supported within the housing, a spindle operatively coupled to an output of the drive mechanism such that torque from the drive mechanism rotates the spindle about an axis, and a clutch assembly configured to selectively limit torque transfer from the drive mechanism to the spindle. The clutch assembly includes a plurality of rolling elements, a biasing member configured to bias the plurality of rolling elements into engagement with the output of the drive mechanism, and a sleeve movable along the axis to adjust a torque limit of the clutch assembly by varying a preload of the biasing member. The sleeve is made of a high-temperature, engineering thermoplastic.

20 Claims, 5 Drawing Sheets

(56) References Cited

U.S. PATENT DOCUMENTS

| | | | |
|---|---|---|---|
| 10,940,580 B2 | 3/2021 | Brennenstuhl et al. | |
| 11,267,118 B2* | 3/2022 | Kamiya | B25D 11/106 |
| 11,498,190 B2* | 11/2022 | Kamiya | B25D 11/106 |
| 2009/0025951 A1 | 1/2009 | Frauhammer et al. | |
| 2011/0017484 A1 | 1/2011 | Roehm | |
| 2014/0338940 A1 | 11/2014 | Kelleher et al. | |
| 2016/0354132 A1 | 12/2016 | Nino et al. | |
| 2017/0157753 A1* | 6/2017 | Nagasaka | B23B 45/00 |
| 2018/0264637 A1* | 9/2018 | Kuehne | B25F 5/001 |
| 2020/0262036 A1 | 8/2020 | Araki et al. | |

FOREIGN PATENT DOCUMENTS

| | | | | |
|---|---|---|---|---|
| DE | 102006012465 A1 | | 11/2006 | |
| EP | 1724068 B1 | | 4/2008 | |
| EP | 2777891 A1 | * | 9/2014 | ........... B25B 23/141 |
| JP | 2007314118 A | | 12/2007 | |
| JP | 2020143228 A | | 9/2020 | |

\* cited by examiner

CLUTCH ASSEMBLY FOR A POWER TOOL

CROSS-REFERENCE TO RELATED APPLICATIONS

The present application claims priority to U.S. Provisional Patent Application No. 63/234,358, filed Aug. 18, 2021, the entire content of which is incorporated herein by reference.

FIELD

The present disclosure relates to power tools and more particularly to clutch assemblies for rotary power tools.

BACKGROUND

Some power tools, specifically rotary power tools, may include a clutch assembly for limiting an amount of torque transferred by the power tool to a workpiece. These tools typically include a clutch-setting selector to allow an operator to select different torque limits.

Some clutch assemblies on rotary power tools can be selectively enabled and disabled to provide the tool with different modes (e.g., a drilling mode in which the clutch assembly is disabled or "locked out", a driving mode in which the clutch assembly is enabled and able to slip at a desired torque setting). Such clutch assemblies include a lock ring that blocks movement of displaceable clutch elements to prevent the clutch from slipping, thereby disabling or "locking out" the clutch assembly. The lock ring, however, adds additional axial length to the tool.

SUMMARY

The present disclosure provides, in one aspect, a power tool including a housing, a drive mechanism supported within the housing, a spindle operatively coupled to an output of the drive mechanism such that torque from the drive mechanism rotates the spindle about an axis, and a clutch assembly configured to selectively limit torque transfer from the drive mechanism to the spindle. The clutch assembly includes a plurality of rolling elements, a biasing member configured to bias the plurality of rolling elements into engagement with the output of the drive mechanism, and a sleeve movable along the axis to adjust a torque limit of the clutch assembly by varying a preload of the biasing member. The sleeve is made of a high-temperature, engineering thermoplastic.

The present disclosure provides, in another aspect, a power tool including a housing, a drive mechanism supported within the housing, a spindle operatively coupled to an output of the drive mechanism such that torque from the drive mechanism rotates the spindle about an axis, and a clutch assembly configured to selectively limit torque transfer from the drive mechanism to the spindle. The clutch assembly includes a plurality of rolling elements, a biasing member configured to bias the plurality of rolling elements into engagement with the output of the drive mechanism, and a sleeve movable along the axis to adjust a torque limit of the clutch assembly by varying a preload of the biasing member. The sleeve is movable to a lockout position in which the biasing member is fully compressed to prevent axial displacement of the plurality of rolling elements, and the biasing member includes a wave spring.

The present disclosure provides, in another aspect, a power tool including a housing with a gear case, a drive mechanism supported at least partially within the gear case, a spindle operatively coupled to an output of the drive mechanism such that torque from the drive mechanism rotates the spindle about an axis, and a clutch assembly configured to selectively limit torque transfer from the drive mechanism to the spindle. The clutch assembly includes a plurality of rolling elements, a biasing member configured to bias the plurality of rolling elements into engagement with the output of the drive mechanism, and a sleeve movable along the axis to adjust a torque limit of the clutch assembly by varying a preload of the biasing member. The sleeve includes an inner thread defining a first pitch width, the gear case includes an outer thread defining a second pitch width and meshed with the inner thread such that rotation of the sleeve about the axis relative to the gear case causes the sleeve to move along the axis relative to the gear case, and the first pitch width is greater than the second pitch width.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
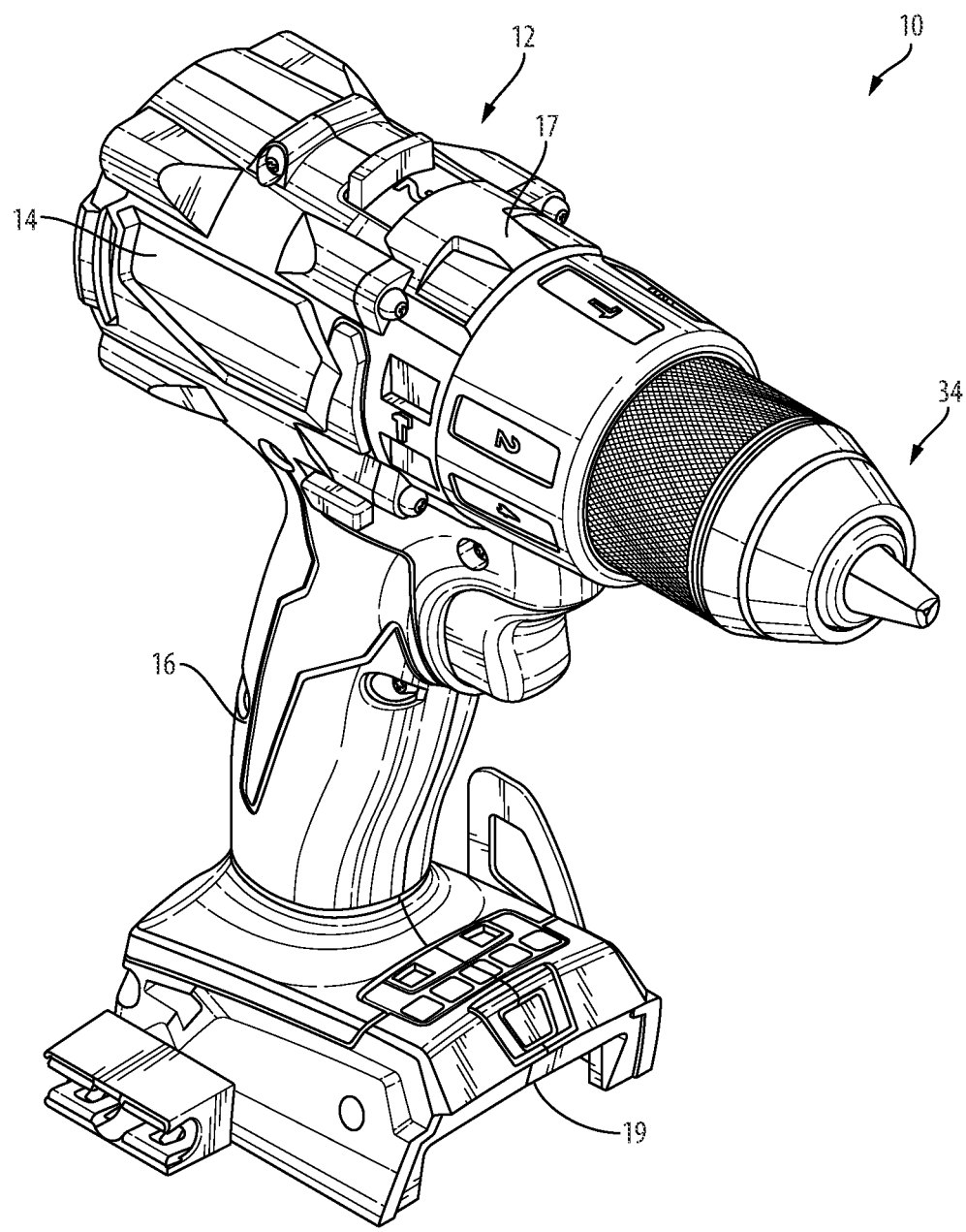
FIG. 1 is a perspective view of a rotary power tool including a clutch assembly according to an embodiment of the present disclosure.

FIG. 1 illustrates a rotary power tool 10 in the form of a drill. The power tool 10 includes a housing 12 having a motor housing portion 14 a handle portion 16 extending from the motor housing portion 14, and a front housing portion or gear case 17 coupled to a front side of the motor housing portion 14. A battery receptacle 19 is located at the bottom end of the handle portion 16 and is configured to receive a battery (e.g., a rechargeable power tool battery pack; not shown).

A drive mechanism 18 (FIG. 2) is disposed within the housing 12 and includes an electric motor 22 supported within the motor housing portion 14 and a transmission 26 coupled to an output shaft 27 of the electric motor 22 and supported at least partially within the gear case 17. In the illustrated embodiment, the transmission 26 is a multi-speed planetary transmission, which is shiftable to provide the power tool 10 with different output speeds. In other embodiments, other types of transmissions may be used.

Figure 2:
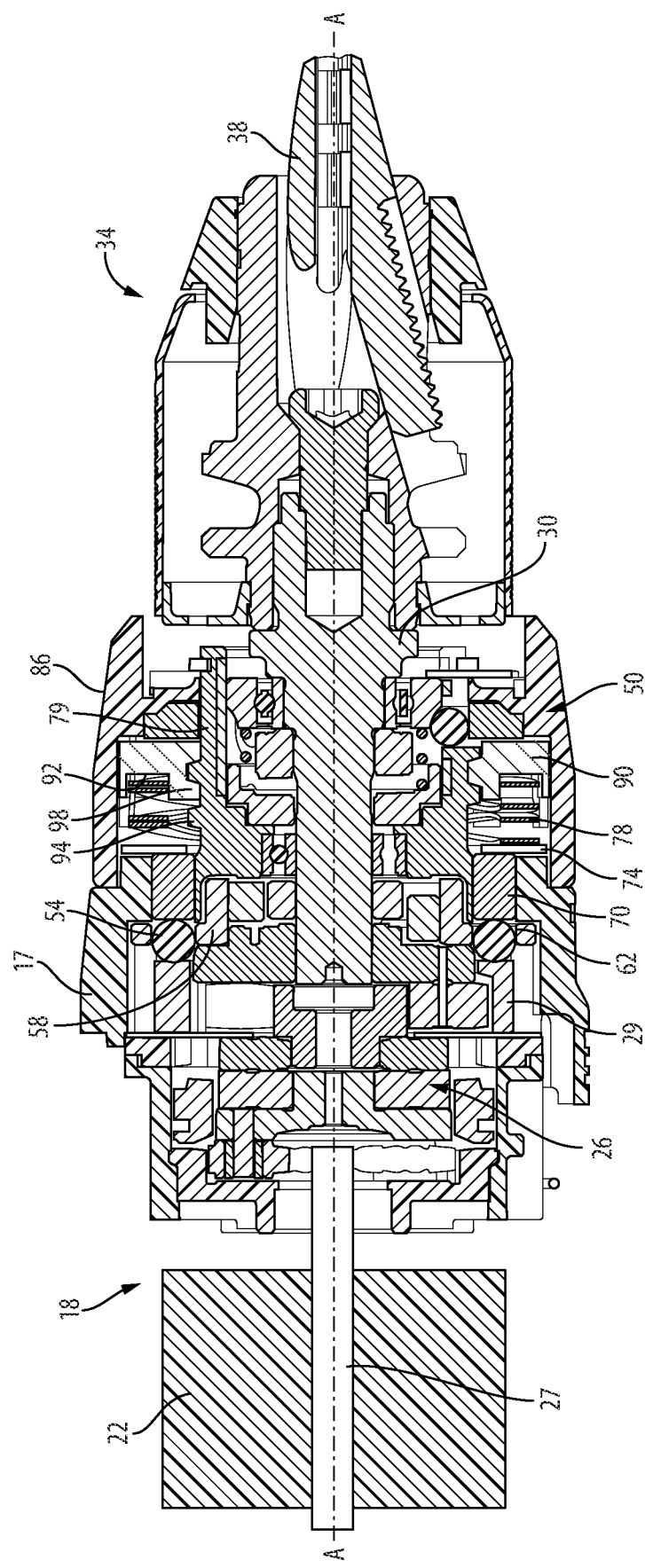
FIG. 2 is an enlarged cross-sectional view of a portion of the rotary power tool of FIG. 1.

With continued reference to FIG. 2, the illustrated transmission 26 includes an output 29 (i.e. a last stage ring gear, which in some embodiments may be a last stage carrier or other rotational output). The output 29 of the transmission 26 is operatively coupled to a spindle 30 via a clutch assembly 50, described in greater detail below, such that torque may be transferred from the output 29 to the spindle 30 to rotate the spindle 30 about a rotational axis A. The clutch assembly 50 selectively limits the torque transfer from the output 29 of the transmission 26 to the spindle 30. In some embodiments, the transmission 26 may be shiftable between a low-speed setting and a high-speed setting. In some such embodiments, the clutch assembly 50 may be bypassed when the transmission 26 is in the high-speed setting. In the illustrated embodiment, the rotational axis A of the spindle 30 is coaxial with the motor output shaft 27; but, the motor output shaft 27 may be oriented parallel or perpendicular to the rotational axis A of the spindle 30 in other embodiments.

With continued reference to FIG. 2, the illustrated drive mechanism 18 further includes a chuck 34 located at an end of the spindle 30 opposite the transmission 26 and coupled for co-rotation with the spindle 30. The chuck 34 includes a plurality of jaws 38 configured to support a working tool bit (e.g., a drill bit, screwdriver bit, or the like; not shown). Torque is transmitted from the electric motor 22 through the transmission 26 and spindle 30 to the chuck 34 to be imparted on a workpiece.

Figure 3:
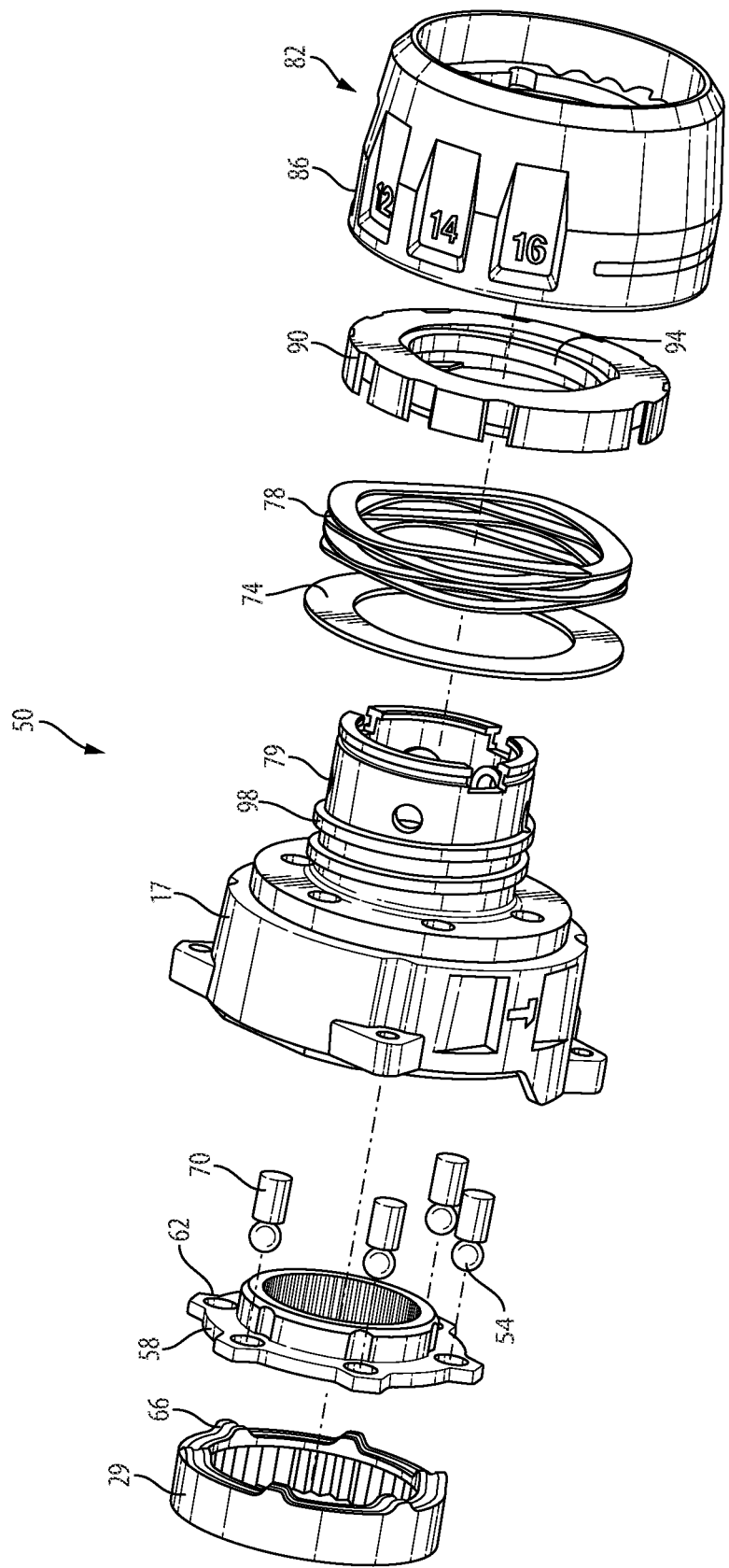
FIG. 3 is an exploded detail view of the clutch assembly of the rotary power tool of FIG. 1.

The illustrated clutch assembly 50 includes a plurality of spherical rolling elements 54 supported within a cage 58 that is coupled for co-rotation with the spindle 30 (e.g., via one or more intermediate splined rings keyed to the spindle 30, such that the spindle 30 may be permitted to move axially relative to the cage 58). Each of the plurality of spherical rolling elements 54 is disposed within a respective bore 62 formed in the cage 58 (FIG. 3). The bores 62 are evenly spaced in a circumferential direction of the cage 58.

Referring to FIG. 3, the rolling elements 54 engage a plurality of forwardly-extending projections or detents 66 on the output 29 of the transmission 26. That is, each of the plurality of detents 66 interacts with a rolling element 54 to transmit torque through the rolling elements 54, to the cage 58, spindle 30, and chuck 34. As described in greater detail below, the rolling elements 54 are biased into engagement with the detents 66 but are displaceable away from the detents 66, to ride over the detents 66 (or "slip") and thereby permit relative rotation between the output 29 of the transmission 26 and the downstream components of the drive mechanism 18 when torque transfer between the output 29 and the spindle 30 exceeds a selected torque limit of the clutch assembly 50.

In more detail, the clutch assembly 50 is configured to limit the amount of torque capable of being transmitted to the spindle 30. The illustrated clutch assembly 50 includes a plurality of pins 70 biased toward the rolling elements 54 by a biasing arrangement, which in the illustrated embodiment includes a washer 74 and a wave spring 78. The washer 74 and wave spring 78 each surround a nose 79 of the gear case 17. The washer 74 is seated against the front ends of the respective pins 70 to transmit a rearward axial biasing force from the wave spring 78 to the pins 70, which in turn transmit the biasing force to the rolling elements 54. In other embodiments, the biasing arrangement may include a one or more coil springs, one or more disc springs, or the like for biasing the pins 70 toward the rolling elements 54 and, in turn, biasing the rolling elements 54 toward the output 29 of the transmission 26.

The clutch assembly 50 further includes an adjustment mechanism 82 to allow a user to vary the upper torque limit that is transmitted by the clutch 50 prior to slipping. The illustrated adjustment mechanism 82 includes an outer collar 86 and an inner sleeve 90. The outer collar 86 is axially fixed relative to the gear case 17 and rotatable relative to the gear case 17 about the axis A. The inner sleeve 90 is coupled for co-rotation with the outer collar 86 but is axially movable relative to the outer collar 86. The inner sleeve 90 has an annular recess 92 in its rear side which receives an end of the wave spring 78

Figure 4:
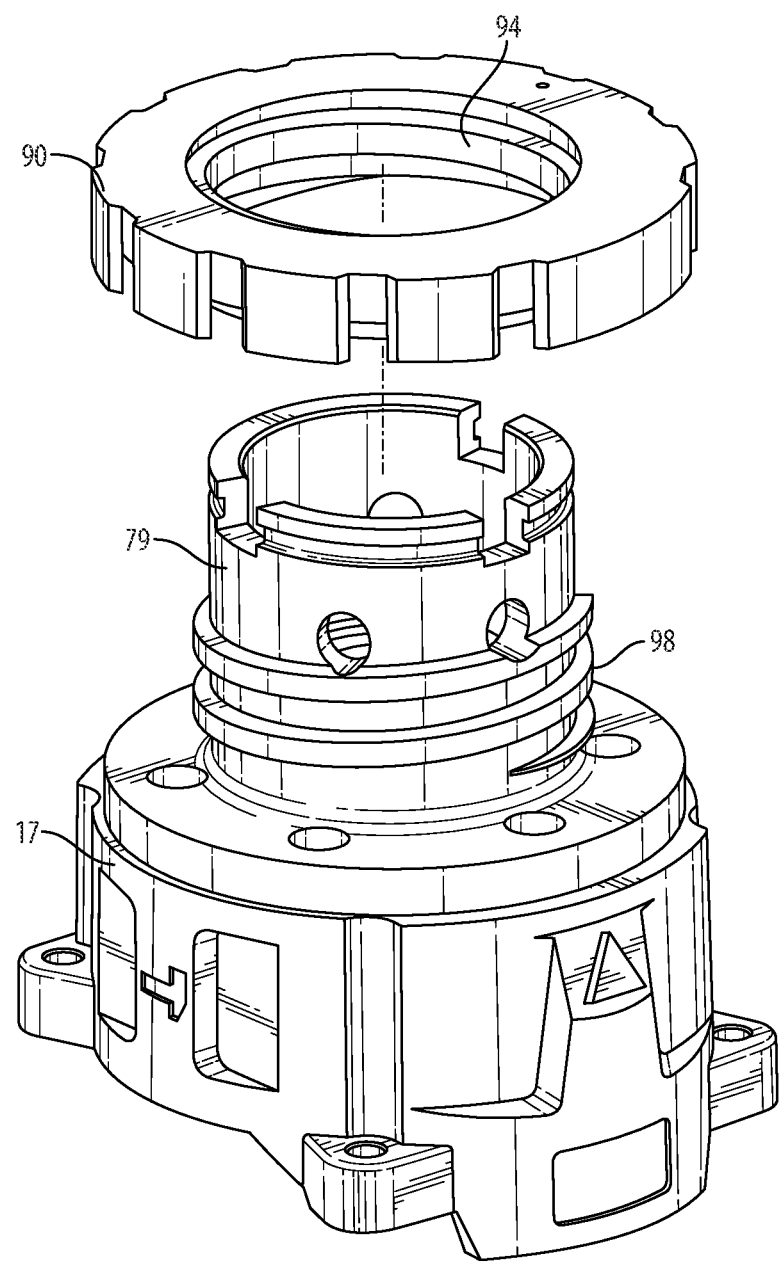
FIG. 4 is an exploded perspective view illustrating an inner sleeve and a gear case of the rotary power tool of FIG. 1.

With reference to FIG. 4, the inner sleeve 90 and the nose 79 of the gear case 17 each have threads 94, 98, engaged such that rotation of the outer collar 86 and the inner sleeve 90 relative to the gear case 17 results in axial motion of the inner sleeve 90 along the nose 79 of the gear case 17. Thus, rotation of the collar 86 in a first direction to move the inner sleeve 90 axially rearwards (towards the motor 22) compresses the wave spring 78, thereby increasing the force applied onto the rolling elements 54. Likewise, rotation of the collar 86 in a second, opposite direction to move the inner sleeve 90 axially forward (away from the motor 22) reduces the preload on the wave spring 78 and thereby reduces the force applied by the wave spring 78 onto the rolling elements 54. In some embodiments, the outer collar 86 may include a detent mechanism and/or indicia to provide tactile and/or visual indications to a user of the amount of adjustment or torque setting applied to the clutch assembly 50.

In some embodiments, the clutch assembly 50 may be adjusted to a lockout position, in which slipping of the clutch assembly 50 is prevented. In some embodiments, the clutch assembly 50 may include a lock ring (not shown) rotatable to selectively block the rolling elements 54 and/or the pins 70 from being axially displaced. Providing such a lock ring, however, adds to the overall length of the power tool 10. The illustrated embodiment of the power tool 10 does not include a separate locking ring, which results in a shorter overall length. To lock out the clutch assembly 50, the collar 86 is rotated in the first direction to move the inner sleeve 90 rearward, until the wave spring 78 is fully compressed. When fully compressed, the wave spring 78 acts as a solid body. The wave spring 78 thus prevents the rolling elements 54 and pins 70 from being displaced away from the detents 66, which in turn prevents the clutch assembly 50 from slipping.

Due to the geometry of the wave spring 78, the wave spring 78 provides a flat, stable configuration when fully compressed without plastically deforming, as opposed to a coil spring, which may tend to buckle outwardly to one side, and which may be susceptible to plastic deformation, impairing future performance. The wave spring 78 is also able to be shorter in axial length than a coil spring, and provides lower tolerance stack up compared to stacked disc springs.

In the illustrated embodiment, the inner sleeve 90 may be made from a plastic material, which provides reduced cost, and which is also designed to control any failures that may result from high axial forces within the clutch assembly 50 when the clutch assembly 50 is in the lockout position. That is, the threads 94 on the plastic inner sleeve 90 may be designed to yield prior to the threads 98 on the gear case 17, which is made of a metal material such as an aluminum alloy.

The plastic inner sleeve 90 is simpler and more cost effective to replace than the gear case 17. However, the inventors have determined that conventional plastic materials may not be suitable for constructive the inner sleeve 90. Thus, in some embodiments, the inner sleeve 90 is formed from a plastic having a glass transition point of at least 70 degrees Celsius, a Young's modulus of at least 10,000 MPa at 120 degrees Celsius, and a tensile strength of at least 140 MPa at 120 degrees Celsius to provide the inner sleeve 90 with sufficient strength and resistance to high temperatures (e.g., up to 120 degrees Celsius) that may occur within the gear case 17 during operation of the power tool 10. Suitable materials include, but are not limited to, polyphthalamide ("PPA"), polyphenylene sulfide ("PPS"), or polyamide 46 ("PA46"). These materials may also be reinforced with fibers, such as glass or aramid fibers to provide even greater strength. In some embodiments, the inner sleeve is formed from PPA having at least 50% by weight of glass fibers. This material has been found to have a tensile strength at 120 degrees Celsius of 159 MPa, and a modulus at 120 degrees Celsius of 15,300 MPa.

Figure 5:
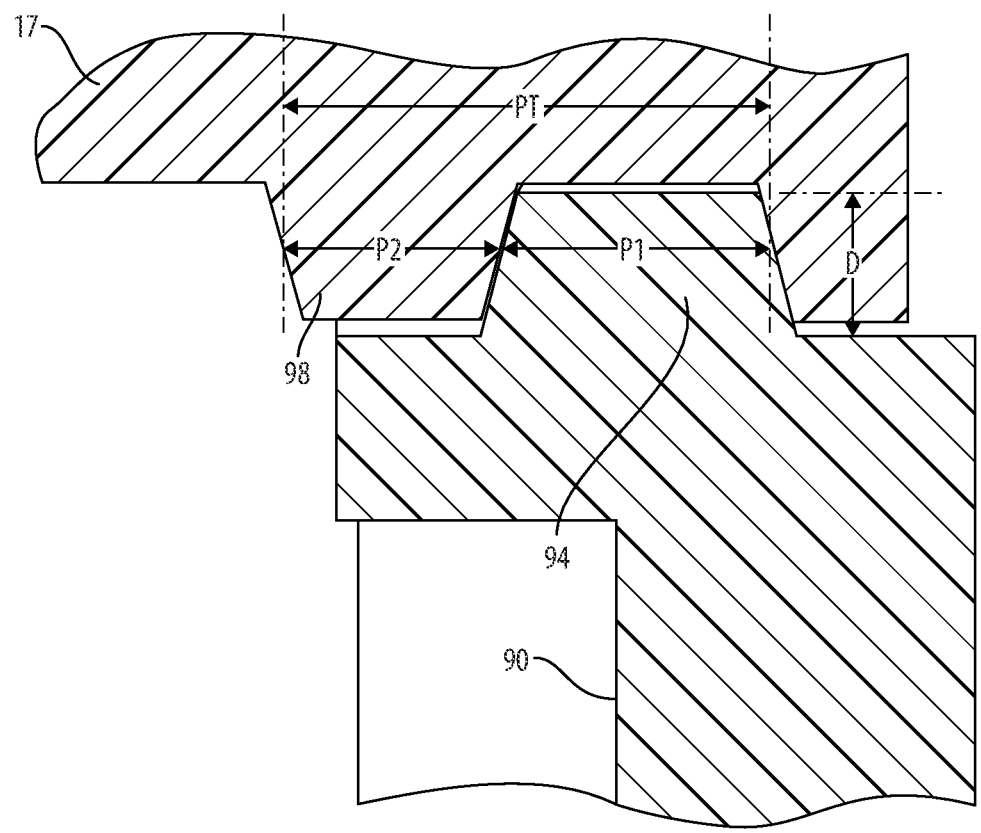
FIG. 5 is a cross-sectional view illustrating a thread geometry of the inner sleeve and gear case of FIG. 4.

To further increase the strength of the inner sleeve 90, the threads 94, 98 may have different geometries. That is, the threads 94 on the inner sleeve 90 and the threads 98 on the gear case 17 may be asymmetric (i.e. different from one another). For example, as illustrated in FIG. 5, the inner sleeve threads 94 have a pitch width P1, and the gear case outer threads 98 have a pitch width P2 that is less than the pitch width P1. Both threads 94, 98 have the same total pitch PT and same root to crest depth D, such that the threads 94, 98 can properly mesh. The pitch width P1 of the inner sleeve threads 94 may be between 10% and 30% greater than the pitch width P2 of the outer gear case threads 98, and in the illustrated embodiment, the pitch width P1 is about 24% greater than the pitch width P2. This provides the threads 94 of the plastic inner sleeve 90 with an increase in axial strength compared to if the threads 94 had the same pitch width as the threads 98.

Thus, although the inner sleeve 90 and gear case 17 are formed from different materials, the high temperature engineering thermoplastic construction of the inner sleeve 90 and asymmetric thread configuration (e.g., larger pitch width P1) may provide the threads 94 on the inner sleeve 90 and the threads 98 on the gear case 17 with similar yield strengths and provides the power tool 10 with a high torque capacity with a minimal overall length of the clutch assembly 50. In some embodiments, the clutch assembly 50 may have a peak torque capacity before lockout of about 1,200 inch-pounds. Optionally, threads 94 on the inner sleeve 90 may be configured to fail prior to the threads 98 on the gear case 17, allowing any failure of the clutch assembly 50 to be more predictable and cheaper to repair. For example, the threads 94 may have a yield strength between 1% and 5% less than the threads 98. Finally, the clutch assembly 50 is able to be locked out without requiring a separate lock ring, thereby further reducing the overall axial length of the power tool 10.

Various features and aspects of the invention are set forth in the following claims.

What is claimed is:

1. A power tool comprising:
a housing;
a drive mechanism supported within the housing;
a spindle operatively coupled to an output of the drive mechanism such that torque from the drive mechanism rotates the spindle about an axis; and
a clutch assembly configured to selectively limit torque transfer from the drive mechanism to the spindle, the clutch assembly including
a plurality of rolling elements;
a biasing member configured to bias the plurality of rolling elements into engagement with the output of the drive mechanism; and
a sleeve movable along the axis to adjust a torque limit of the clutch assembly by varying a preload of the biasing member,
wherein the sleeve is made of a high-temperature, engineering thermoplastic.

2. The power tool of claim 1, wherein the housing includes a gear case made of metal, the gear case having a nose through which the spindle extends, and wherein the drive mechanism is at least partially supported within the gear case.

3. The power tool of claim 2, wherein the sleeve includes an inner thread, and wherein the gear case includes an outer thread meshed with the inner thread such that rotation of the sleeve about the axis relative to the gear case causes the sleeve to move along the axis relative to the gear case.

4. The power tool of claim 3, further comprising a collar coupled for co-rotation with the sleeve.

5. The power tool of claim 3, wherein the inner thread has a first pitch width, wherein the outer thread has a second pitch width, and wherein the first pitch width is greater than the second pitch width.

6. The power tool of claim 5, wherein the first pitch width is between 10% and 30% greater than the second pitch width.

7. The power tool of claim 1, wherein the high-temperature, engineering thermoplastic is selected from a group consisting of: polyphthalamide, polyphenylene sulfide, and polyamide 46.

8. The power tool of claim 1, wherein the high-temperature, engineering thermoplastic is reinforced with glass fibers.

9. The power tool of claim 1, wherein the high-temperature, engineering thermoplastic includes 50% glass fibers by weight.

10. The power tool of claim 1, wherein the biasing member includes a wave spring.

11. A power tool comprising:
a housing;
a drive mechanism supported within the housing;
a spindle operatively coupled to an output of the drive mechanism such that torque from the drive mechanism rotates the spindle about an axis; and
a clutch assembly configured to selectively limit torque transfer from the drive mechanism to the spindle, the clutch assembly including
a plurality of rolling elements;
a biasing member configured to bias the plurality of rolling elements into engagement with the output of the drive mechanism; and
a sleeve movable along the axis to adjust a torque limit of the clutch assembly by varying a preload of the biasing member,
wherein the sleeve is movable to a lockout position in which the biasing member is fully compressed to prevent axial displacement of the plurality of rolling elements, and
wherein the biasing member includes a wave spring.

12. The power tool of claim 11, wherein the clutch assembly further includes a cage coupled for co-rotation with the spindle, and wherein the plurality of rolling elements is received in respective bores formed in the cage.

13. The power tool of claim 12, wherein the clutch assembly further includes a plurality of pins aligned with the plurality of rolling elements and a washer engaging a front end of each of the plurality of pins.

14. The power tool of claim 13, wherein a first end of the biasing member abuts the sleeve, and a second end of the biasing member abuts the washer.

15. The power tool of claim 14, wherein the sleeve is made of a high-temperature, engineering thermoplastic.

16. The power tool of claim 15, wherein the high-temperature, engineering thermoplastic has a glass transition point of at least 70 degrees Celsius, a Young's modulus of at least 10,000 MPa at 120 degrees Celsius, and a tensile strength of at least 140 MPa at 120 degrees Celsius.

17. The power tool of claim 11, wherein the sleeve includes threads.

18. A power tool comprising:
a housing including a gear case;
a drive mechanism supported at least partially within the gear case;
a spindle operatively coupled to an output of the drive mechanism such that torque from the drive mechanism rotates the spindle about an axis; and
a clutch assembly configured to selectively limit torque transfer from the drive mechanism to the spindle, the clutch assembly including
a plurality of rolling elements;
a biasing member configured to bias the plurality of rolling elements into engagement with the output of the drive mechanism; and
a sleeve movable along the axis to adjust a torque limit of the clutch assembly by varying a preload of the biasing member,
wherein the sleeve includes an inner thread defining a first pitch width,
wherein the gear case includes an outer thread defining a second pitch width and meshed with the inner thread such that rotation of the sleeve about the axis relative to the gear case causes the sleeve to move along the axis relative to the gear case, and
wherein the first pitch width is greater than the second pitch width.

19. The power tool of claim 18, wherein the sleeve is movable to a lockout position in which the biasing member is fully compressed to prevent axial displacement of the plurality of rolling elements.

20. The power tool of claim 18, wherein the first pitch width is between 10% and 30% greater than the second pitch width.

* * * * *